United States Patent
Repic et al.

(10) Patent No.: US 7,021,527 B2
(45) Date of Patent: Apr. 4, 2006

(54) CODE COMPLIANT, TRASH AND/OR LINEN CHUTE INLET DOOR

(76) Inventors: Edward Lawrence Repic, 110 Wallace Cir., Aliquippa, PA (US) 15001; Michael Wayne Ennis, 738 Clark Dr., Tallmadge, OH (US) 44278; Seymour Oestreicher, 7096 DeMedici Cir., Delray Beach, FL (US) 33446

(*) Notice: Subject to any disclaimer, the term of this patent is extended or adjusted under 35 U.S.C. 154(b) by 0 days.

(21) Appl. No.: 10/694,655

(22) Filed: Oct. 27, 2003

(65) Prior Publication Data

US 2004/0084276 A1 May 6, 2004

Related U.S. Application Data

(60) Provisional application No. 60/421,604, filed on Oct. 27, 2002.

(51) Int. Cl.
*B65G 11/04* (2006.01)
(52) U.S. Cl. .......................... 232/44; 193/34
(58) Field of Classification Search .................. 232/44, 232/113; 49/400, 484.1; 193/8, 34, DIG. 2
See application file for complete search history.

(56) References Cited

U.S. PATENT DOCUMENTS

| | | | | |
|---|---|---|---|---|
| 1,297,360 A | * | 3/1919 | Kerner | 193/34 |
| 1,707,011 A | * | 3/1929 | Heybeck | 193/34 |
| 1,733,801 A | * | 10/1929 | Heybeck | 193/34 |
| 2,792,171 A | * | 5/1957 | Rosset | 232/43.3 |
| 2,903,115 A | * | 9/1959 | Kluge | 193/34 |
| 3,204,740 A | * | 9/1965 | Legault | 193/34 |
| 3,261,441 A | * | 7/1966 | Mullens | 193/33 |
| 3,453,776 A | * | 7/1969 | Clarke et al. | 49/7 |
| 3,554,345 A | * | 1/1971 | Mullens | 193/33 |
| 3,713,581 A | * | 1/1973 | Mullens | 232/1 E |
| 3,866,861 A | * | 2/1975 | Ratcliff et al. | 244/118.5 |
| 3,980,166 A | * | 9/1976 | de Feudis | 193/34 |
| 4,694,947 A | * | 9/1987 | Nineberg et al. | 193/34 |
| 5,806,759 A | * | 9/1998 | Axisa | 232/44 |
| 6,062,368 A | * | 5/2000 | Kamm | 193/31 A |

* cited by examiner

Primary Examiner—William L. Miller

(57) ABSTRACT

Permits retrofit trash and linen chute inlet door replacement without destruction of existing B-Label wall/door frame assemblies and introduces advancements never before seen in the chute industry: Compliance to updated U.L.® Standards for B-Label doors, smoke suppression, and air tightness. The invention serves as the basis for a new U.L.® standard for certified retrofit installation of inlets. The inlet provides applicable ADA compliance. The latter results from several design features including a choice of four-access control/operating systems: mechanical, electronic, electro-pneumatic, and fully pneumatic. Each control system defaults a to the "Fail-Safe/Door-Closed" position in the event of component failure, thereby insuring the continued operation of the U.L.®/Life Safety features. Previous art fails in a "door open" position, destroying life safety functionality. Fail-Safe default is the basis of a proposed new NFPA-82 requirement.

6 Claims, 14 Drawing Sheets

CODE-COMPLIANT TRASH &/or LINEN CHUTE INLET DOOR: EXPLODED VIEW FROM REAR

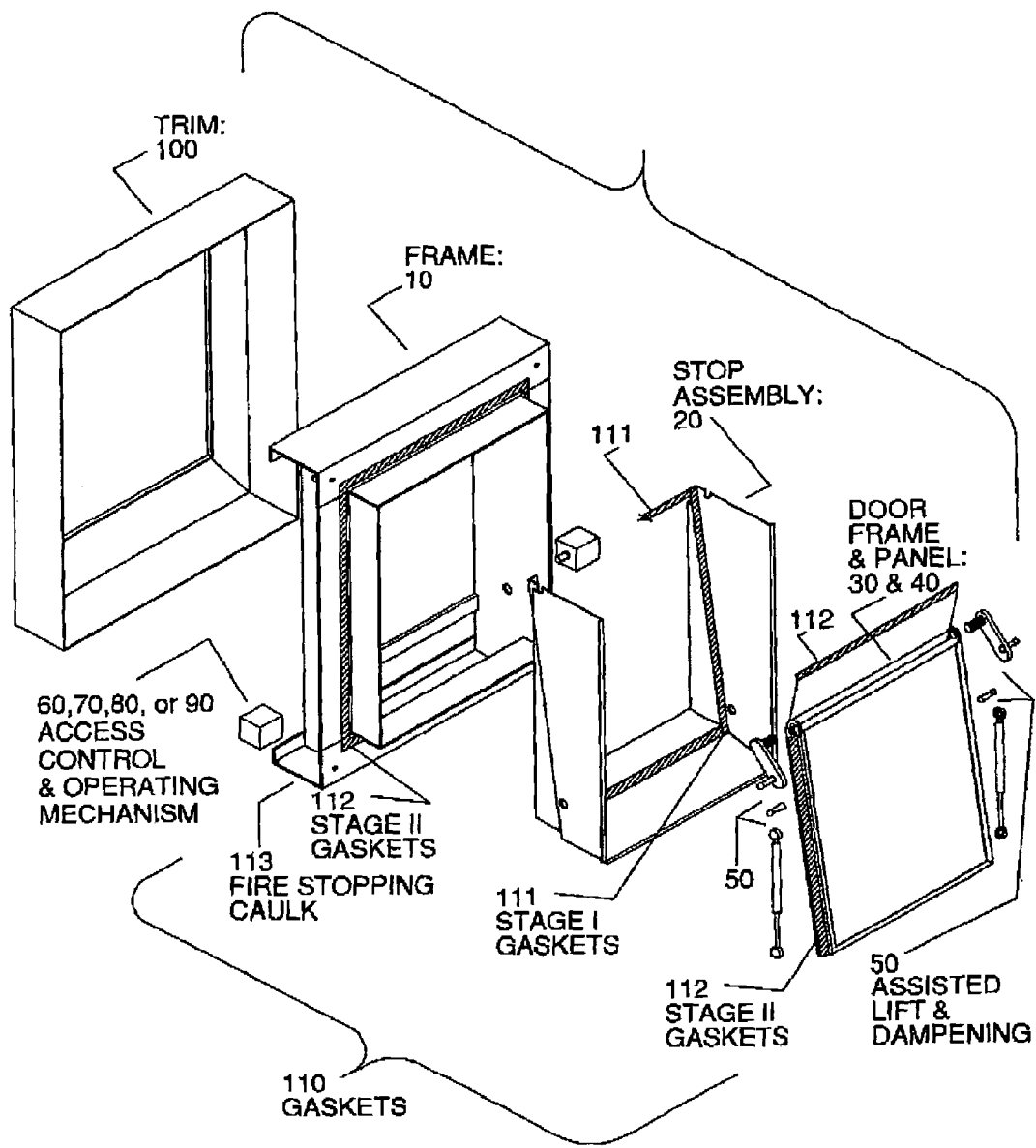
FIG. 1: CODE-COMPLIANT TRASH &/or LINEN CHUTE INLET DOOR: EXPLODED VIEW FROM REAR
(ALSO SEE TABLE, FIG 2)

| Intake Door Sections / Number Series: ||||||
|---|---|---|---|---|---|
| TRIM: | FRAME: | STOP ASSEMBLY | DOOR PANEL: | GASKETS: | ACCESS/ OP. MECH. |
| 100 | 10 | 20 | 30: Frame<br>40: Skin<br>50: Lift/ Dampen | 110 | 60:Manual<br>70:Electric<br>80:Elec-Pn<br>90:Pneu-matic |
| Assigned Component Part Numbers in Series: ||||||
| 101 – 104 | 11 – 18 | 21 – 23 | 31 – 35<br>41 – 43<br>50 – 55 | 111 :Stg I<br>112:Stg II<br>113:Intums. Caulk | 61 – 66<br>71 – 74<br>81 – 86<br>91 – 99 |
| Code/Compliance Assisted by Sections & Components: ||||||
| – | NFPA-80 | – | – | NFPA-80 | – |
| – | – | – | – | NFPA-82 | NFPA-82 |
| NFPA-105 | NFPA-105 | – | NFPA-105 | NFPA-105 | – |
| – | – | – | NFPA-new | – | NFPA-new |
| – | UL 10C | UL 10C | UL 10C | UL 10C | UL 10C |
| – | – | – | – | UL 94 | – |
| – | UL 1784 | UL 1784 | – | UL 1784 | UL 1784 |
| UL (new) | UL (new) | – | – | UL (new) | – |
| ADA | ADA | – | ADA | – | ADA |

FIG. 2: TABLE OF INTERRELATIONSHIPS: SECTIONS & PARTS TO COMPLIANCES
(ALSO SEE FIG. 1.)

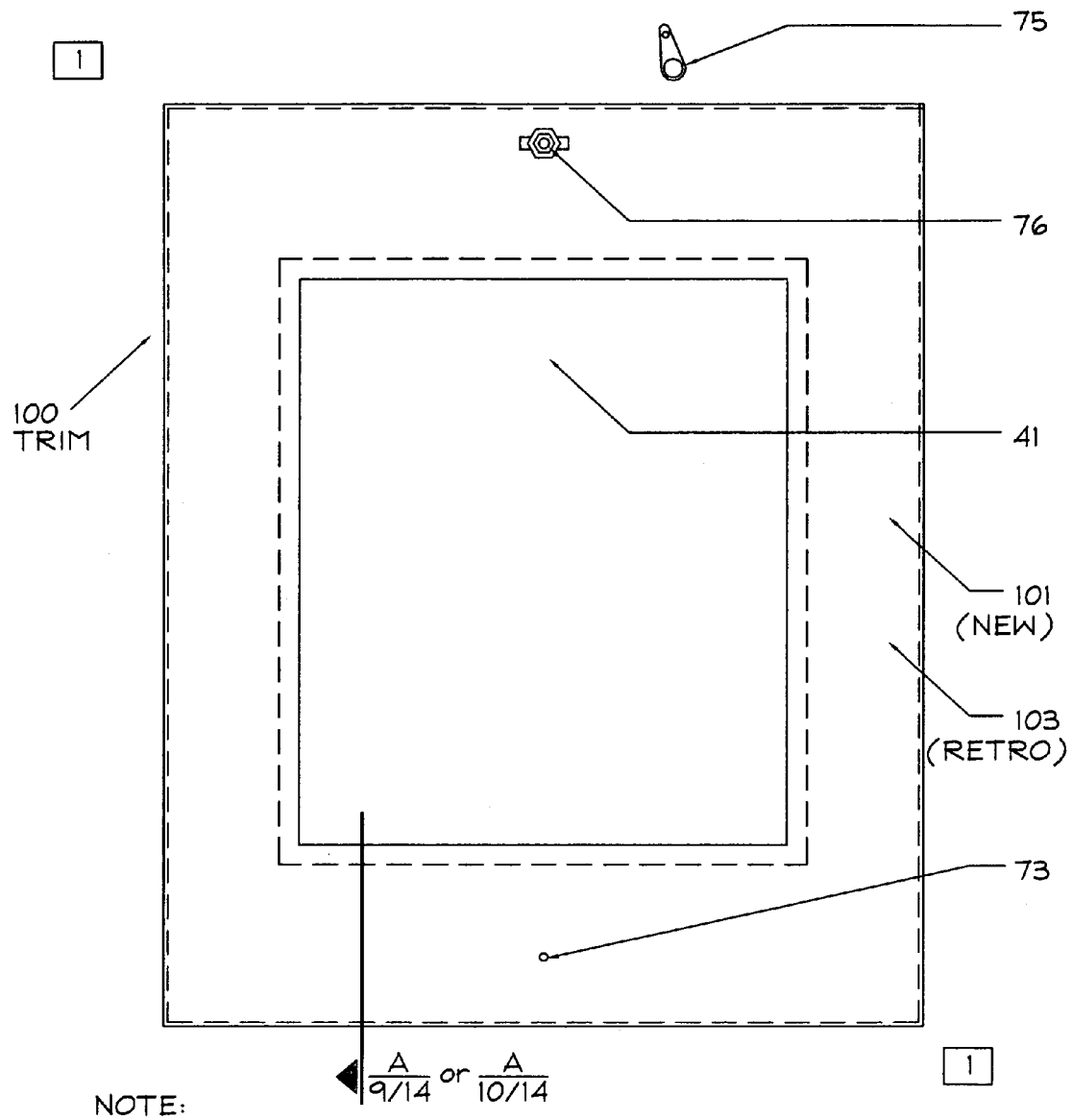
FIG. 3: FRONT ELEVATION

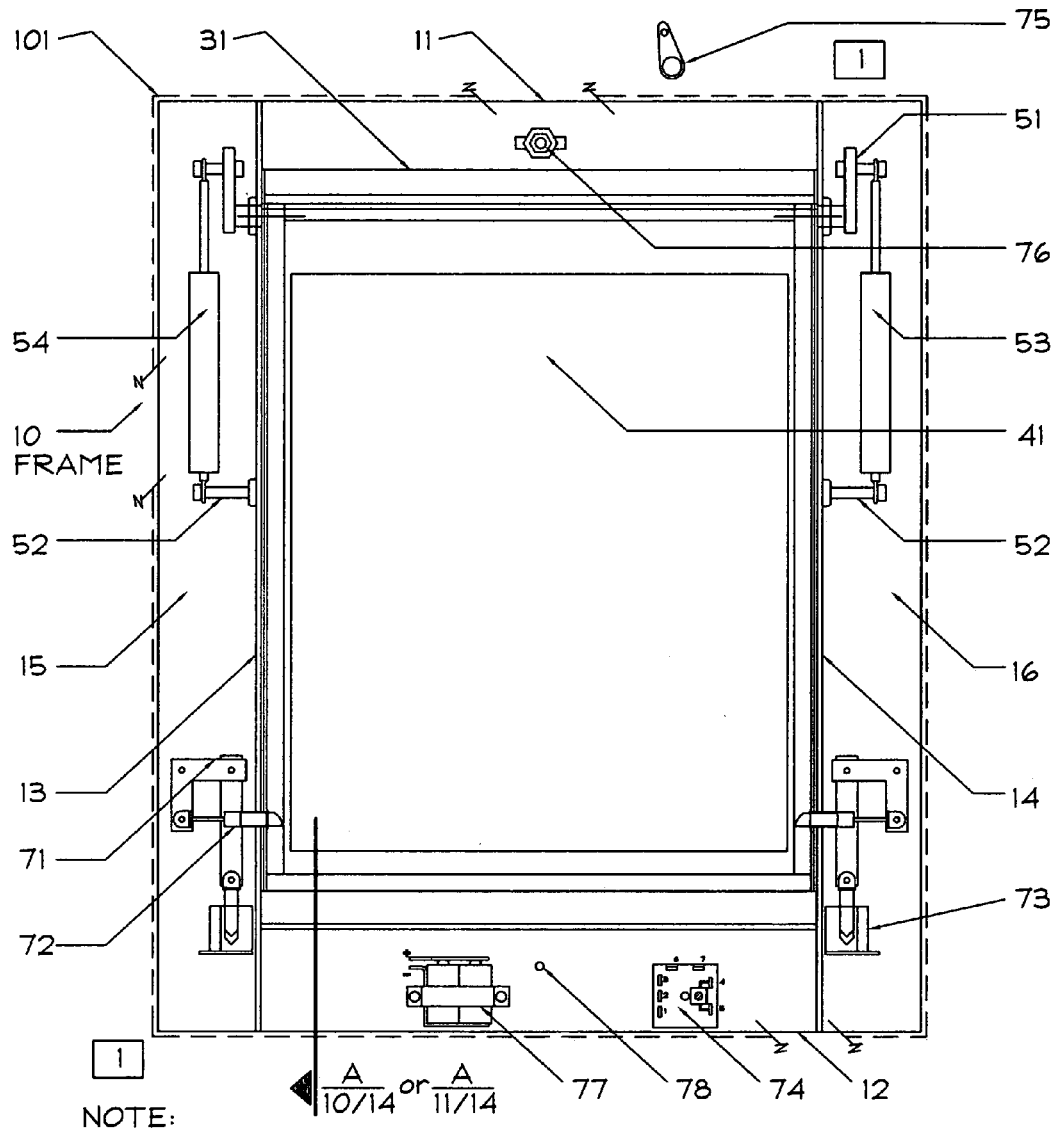
NOTE:
THE ACCESS CONTROL SYSTEM SHOWN ON DRAWINGS 6, 7, & 8/14 IS THE STANDARD ELECTRONIC SYSTEM FOR RETROFIT INSTALLATIONS. EACH OF THE FOUR (4) AVAILABLE DUAL LATCHING SECURITY/ACCESS CONTROL SYSTEMS IS DIAGRAMMED ON FIG.'S 8 THRU 10. REFER TO DRAWING 5/14 FOR ADDITIONAL INFORMATION.
FIG. 4: FRAME ELEVATION

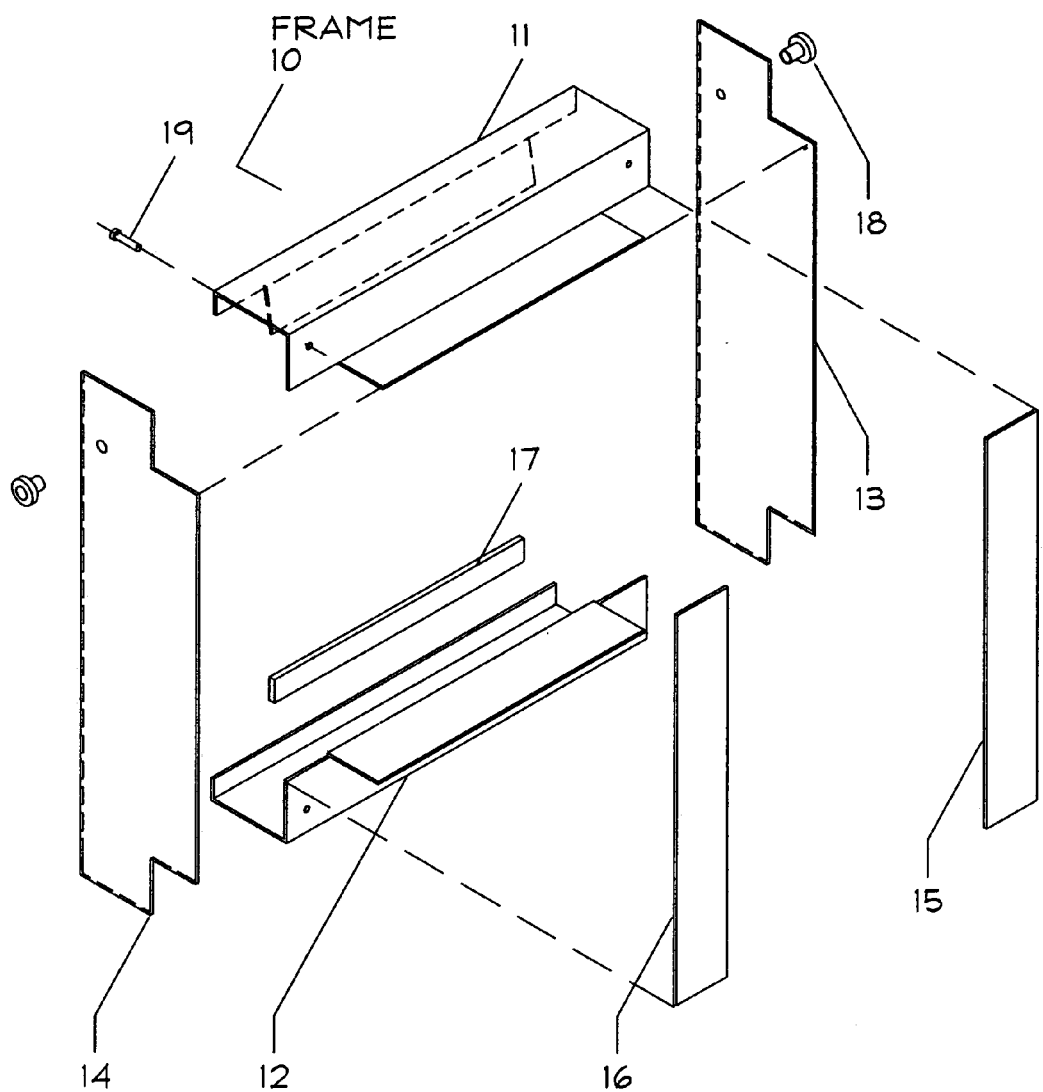
FIG. 5: FRAME, VIEWED FROM REAR: EXPLODED VIEW

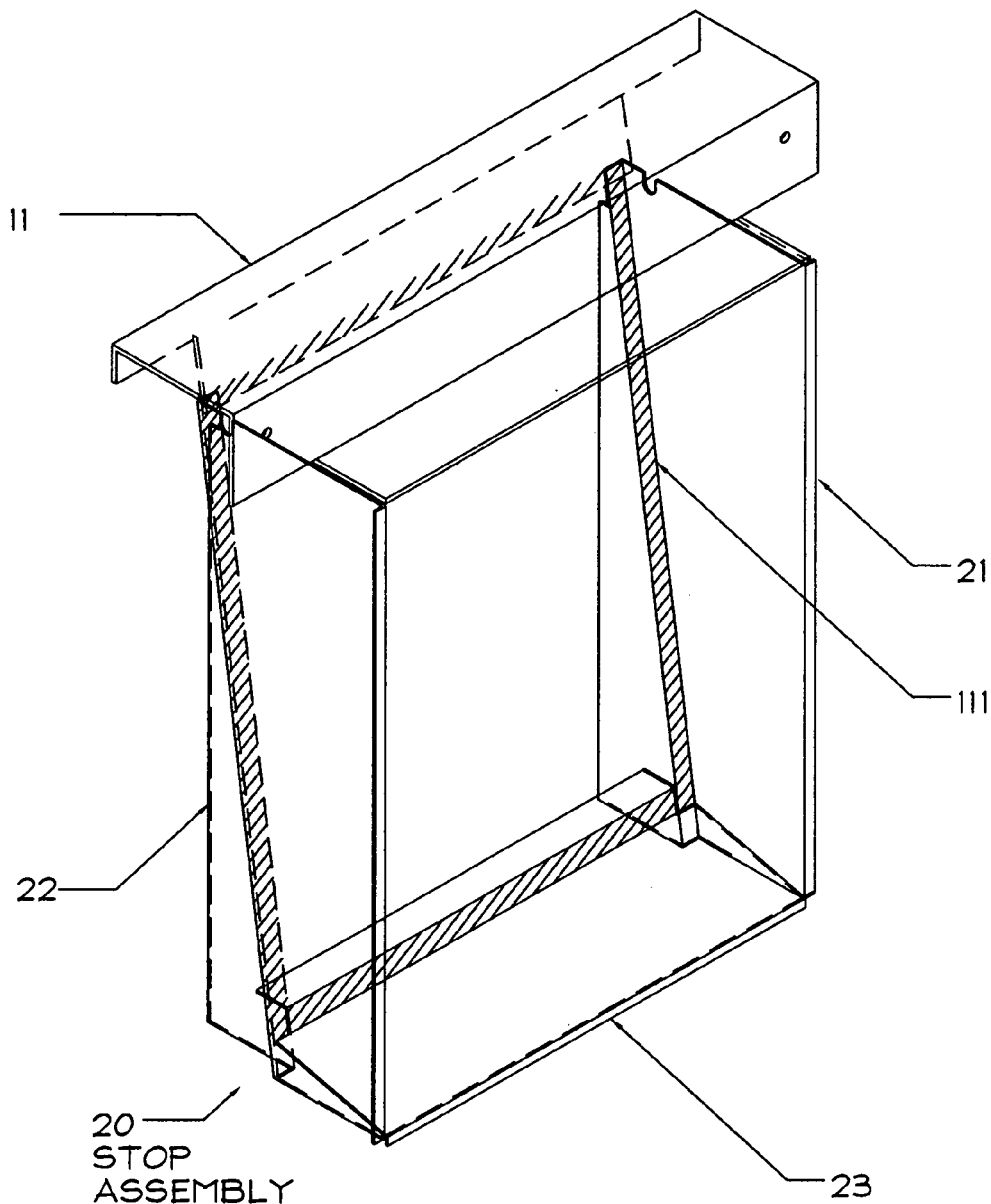
NOTE:
THE COMPONENTS IDENTIFIED CREATE THE MOUNTING SURFACE FOR THE STAGE I GASKET. SEE FIG. 11 (PLAN VIEW) FOR SPECIFIC MONTING DETAILS.
FIG. 6: STOP ASSEMBLY VIEWED FROM REAR

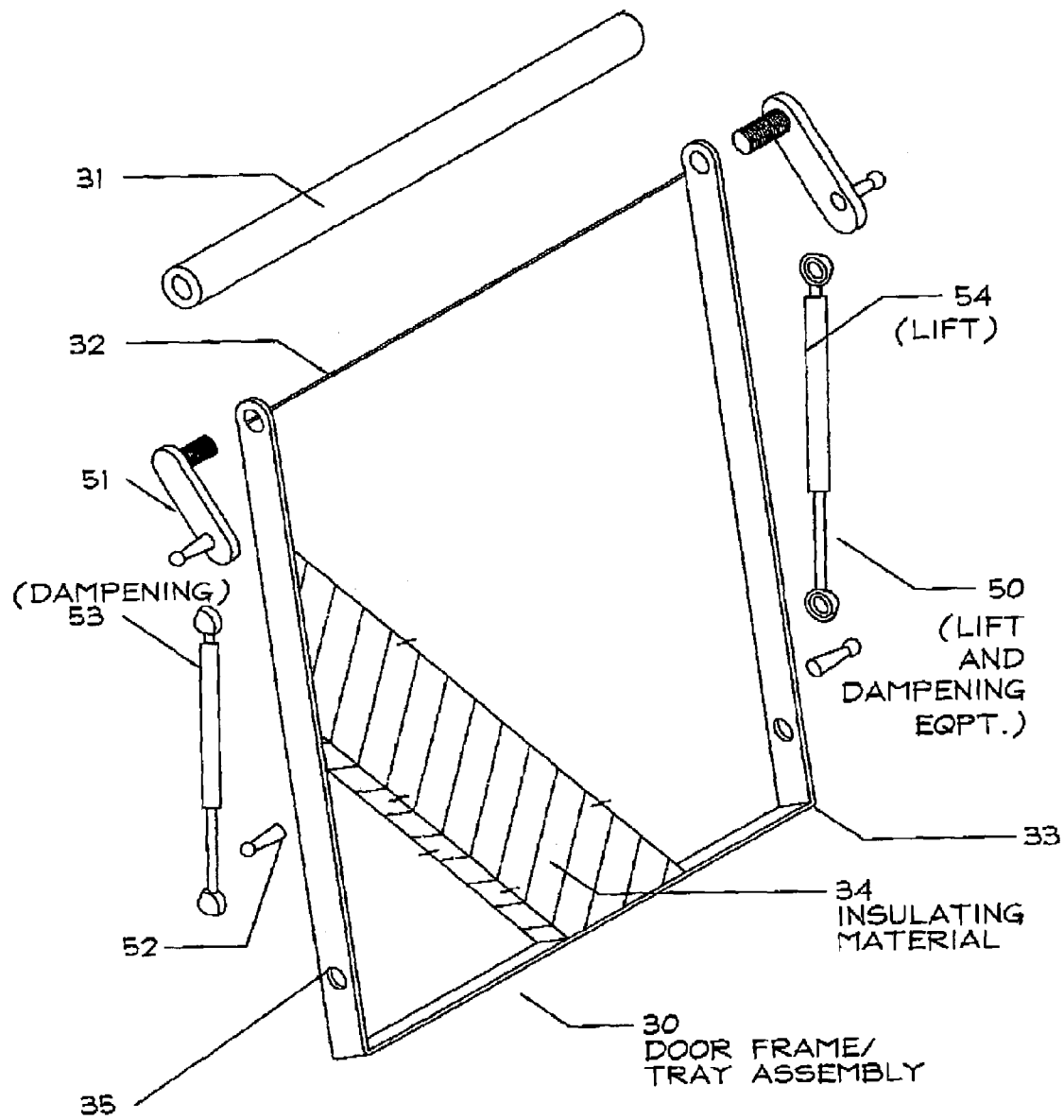
FIG. 7: DOOR FRAME/TRAY ASSEMBLY +ASSISTED LIFT & DAMPENING EQPT.

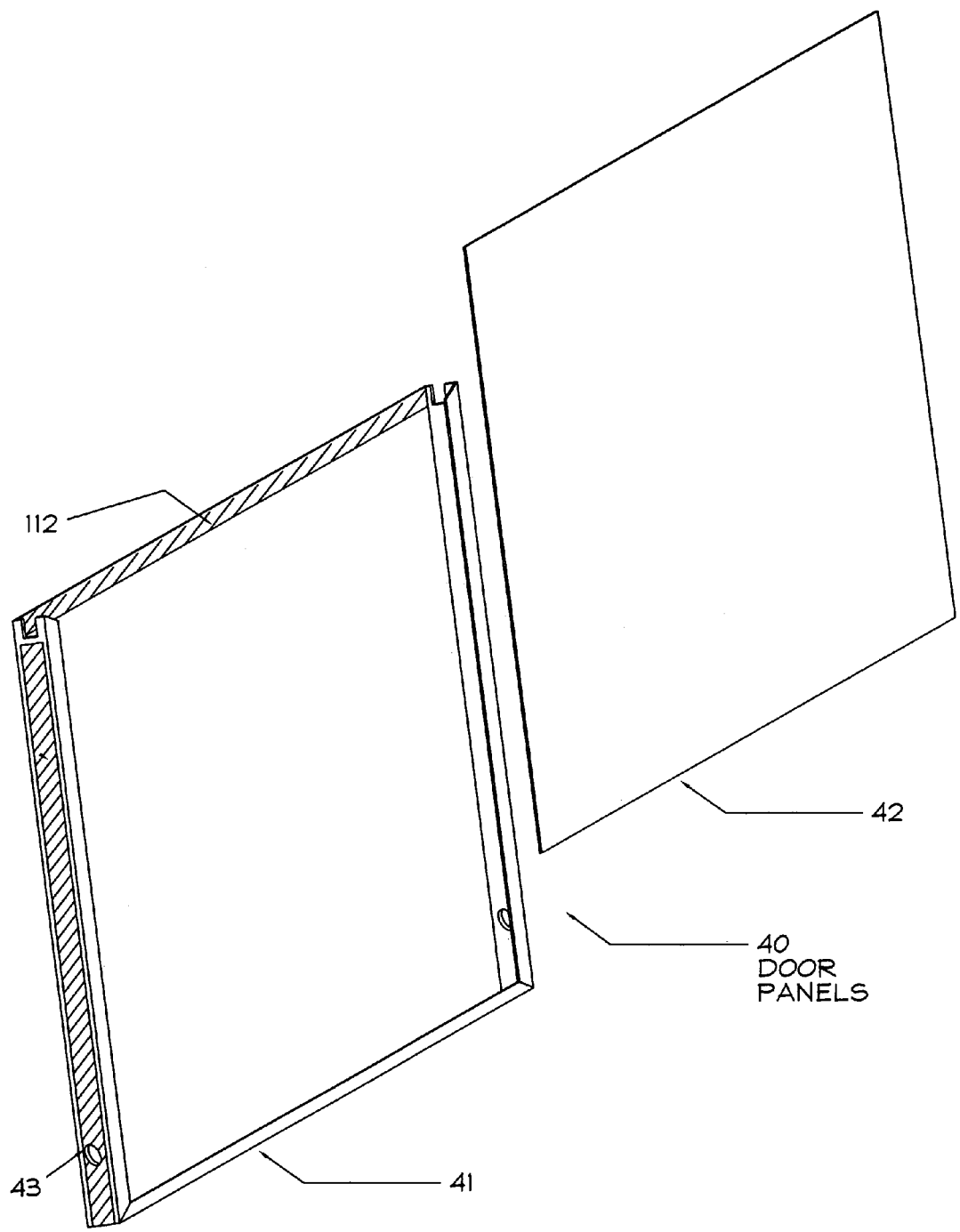
FIG. 8: DOOR PANEL FACES, FROM REAR

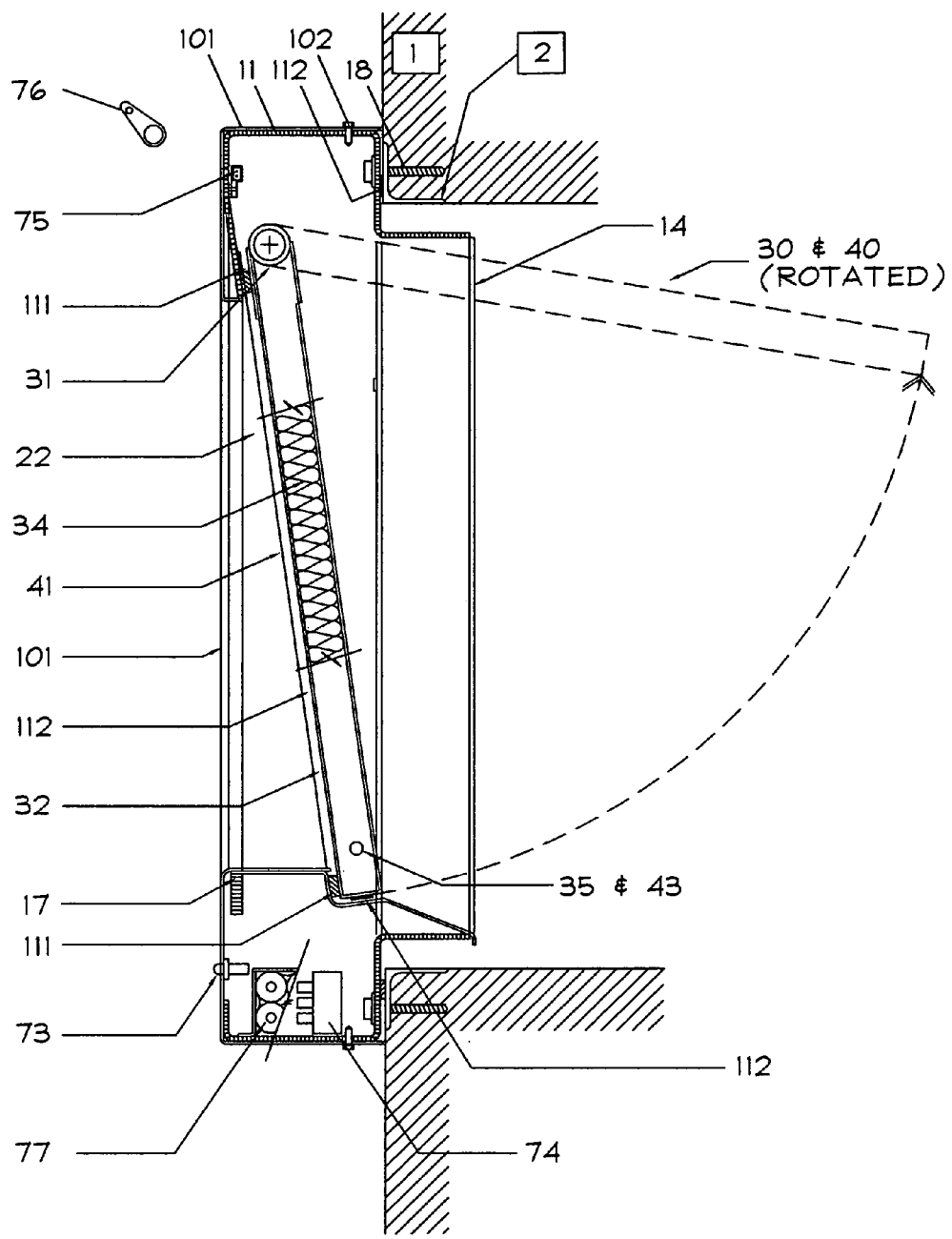
FIG. 9: INTAKE SECTION A/9/14 : FOR RETROFIT CONSTRUCTION

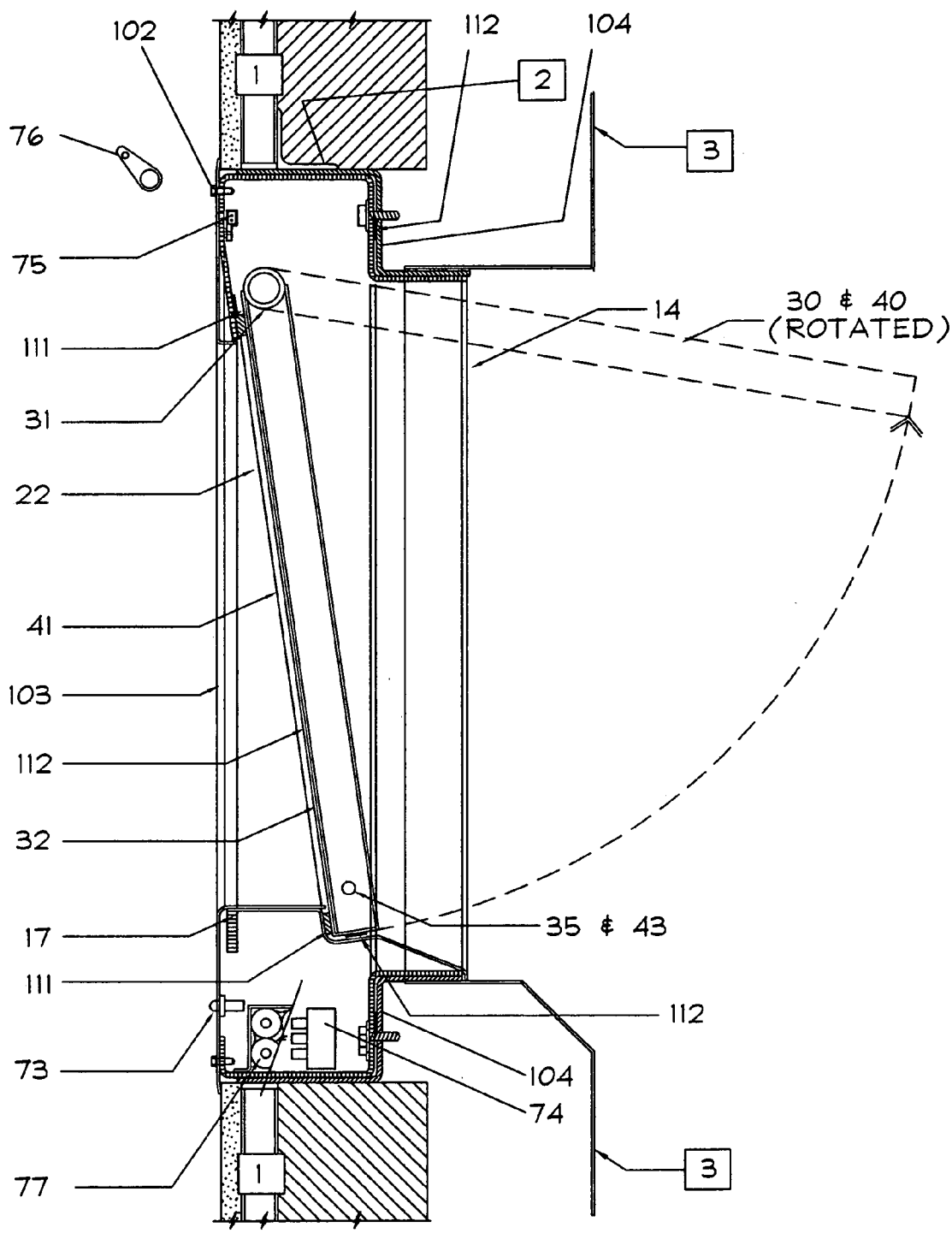
FIG. 10: INLET SECTION $\frac{A}{10/14}$: FOR NEW CONSTRUCTION

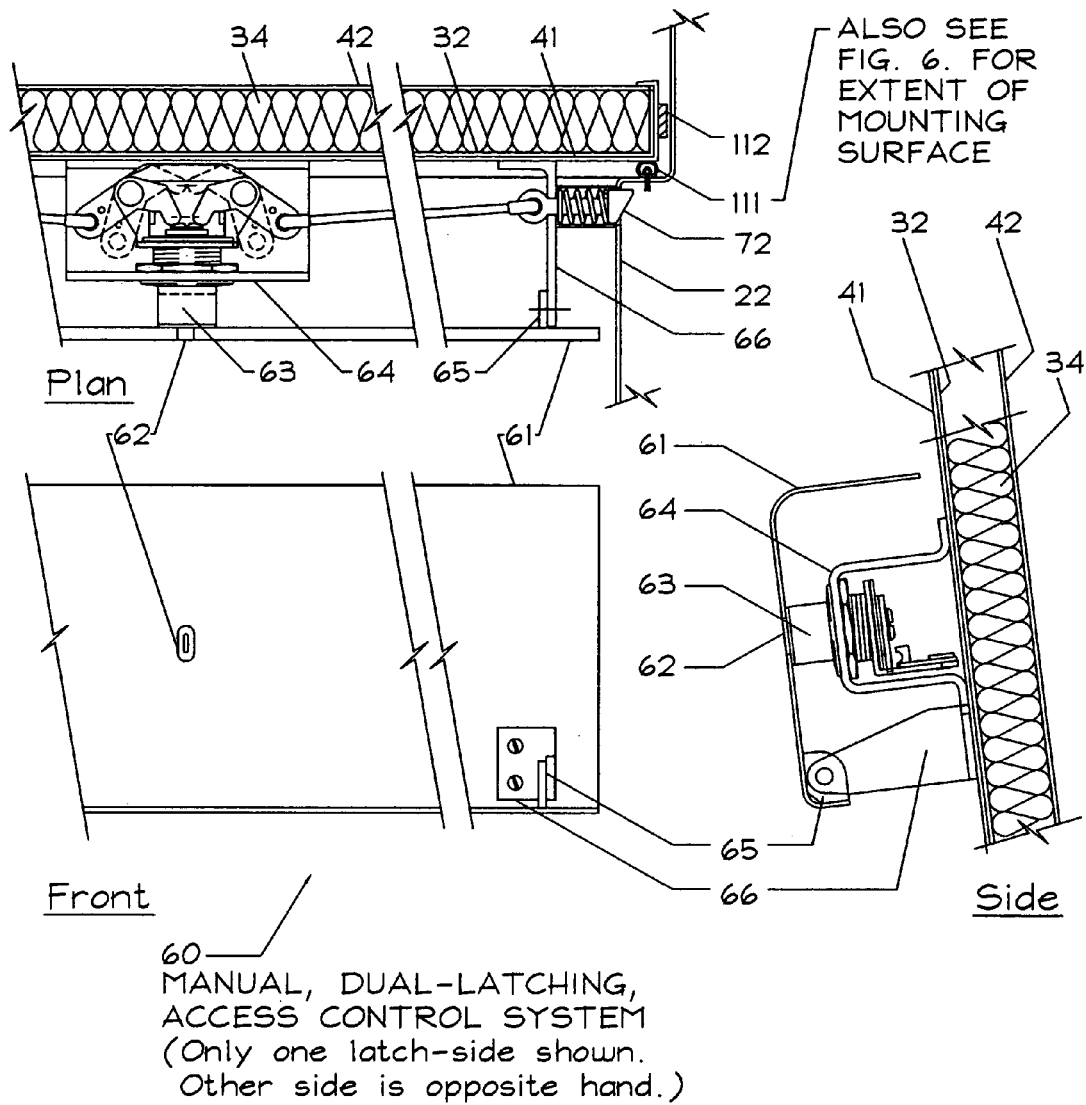
FIG. 11: DUAL, POSITIVE-LATCHING, MECHANICAL SECURITY/ ACCESS CONTROL SYSTEM

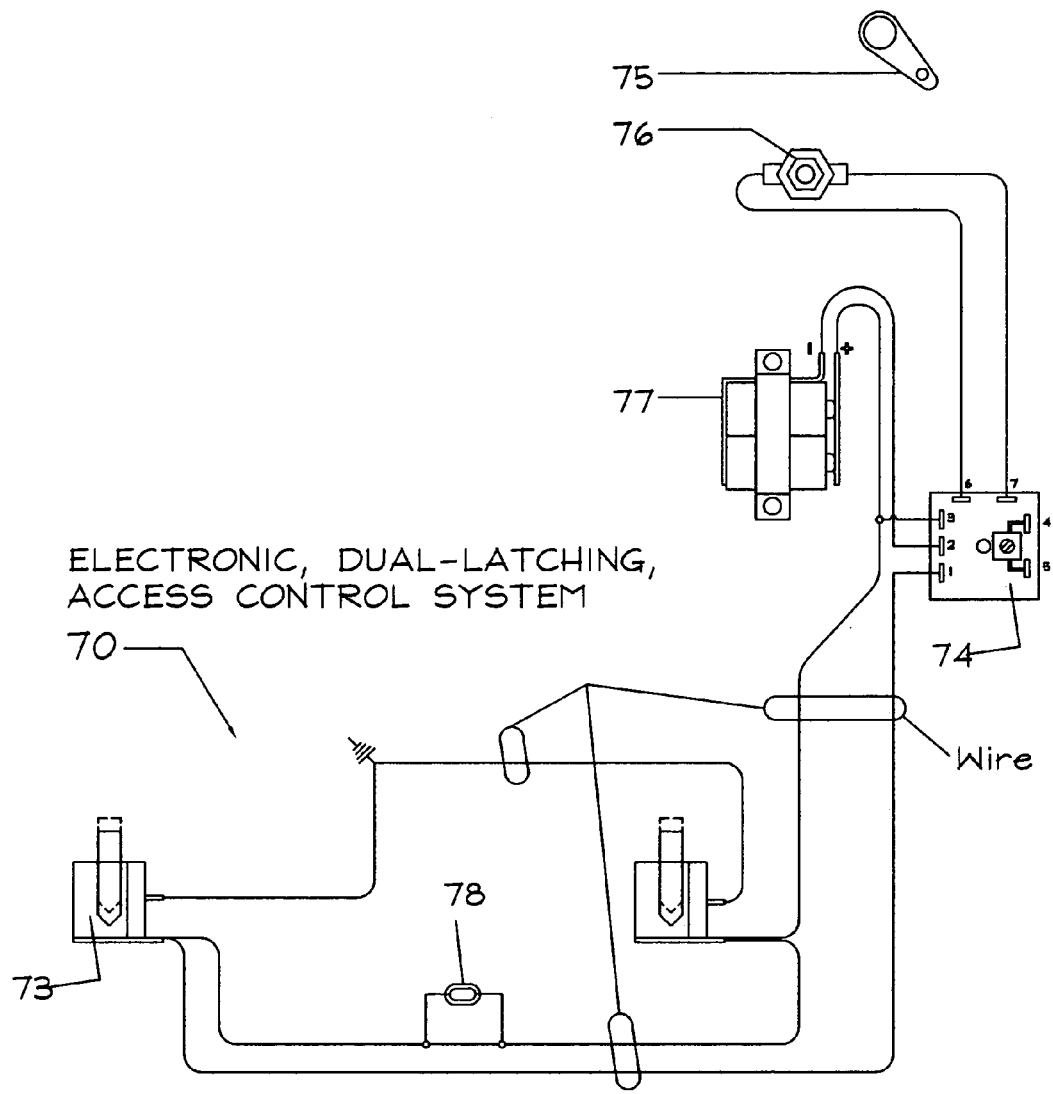
FIG. 12: DUAL, POSITIVE-LATCHING, ELECTRONIC SECURITY/ACCESS CONTROL SYSTEM SCHEMATIC

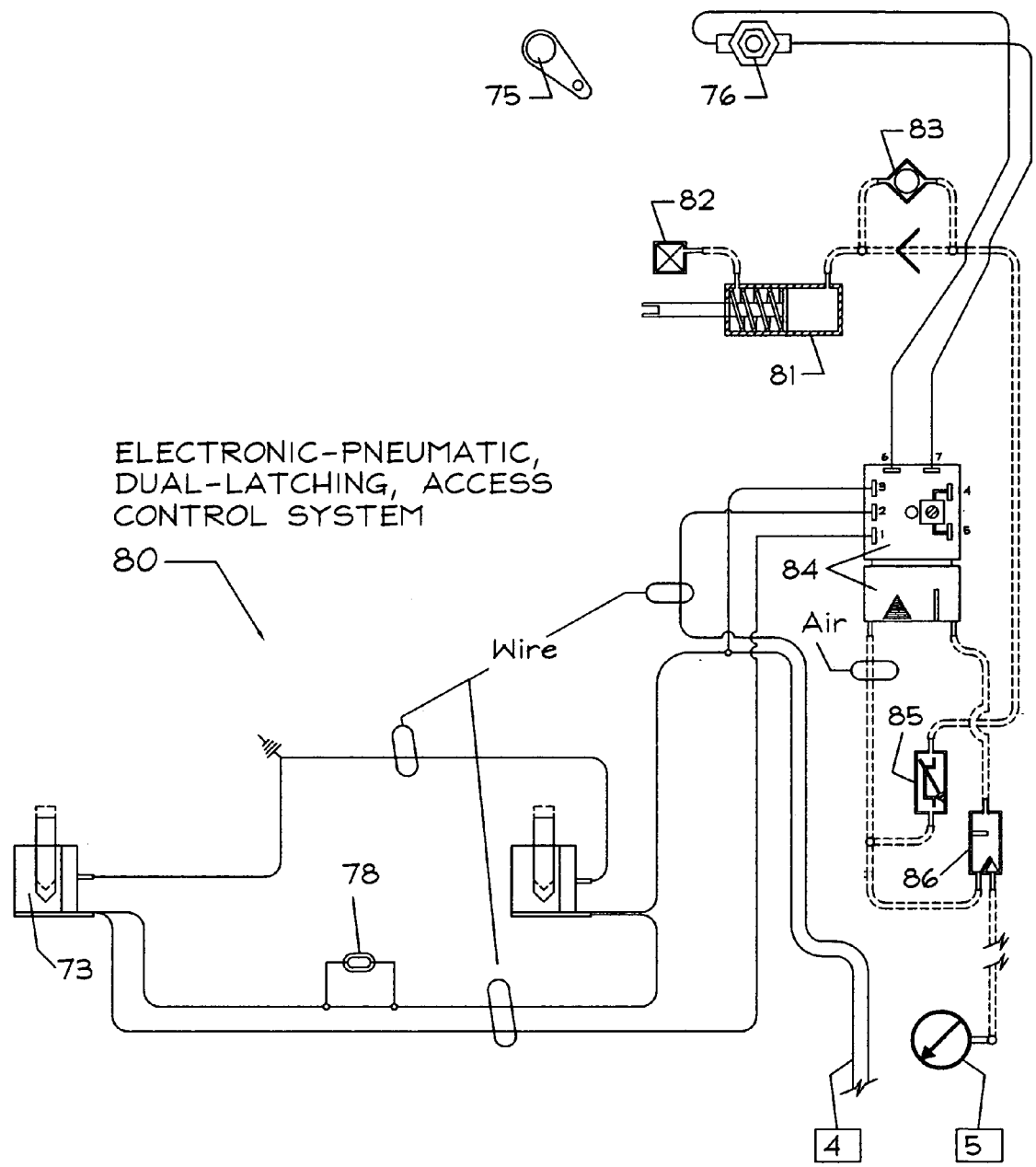
FIG. 13: DUAL, POS.-LATCHING, ELECTRO-PNEUMATIC SECURITY/ACCESS CONTROL SYSTEM SCHEMATIC

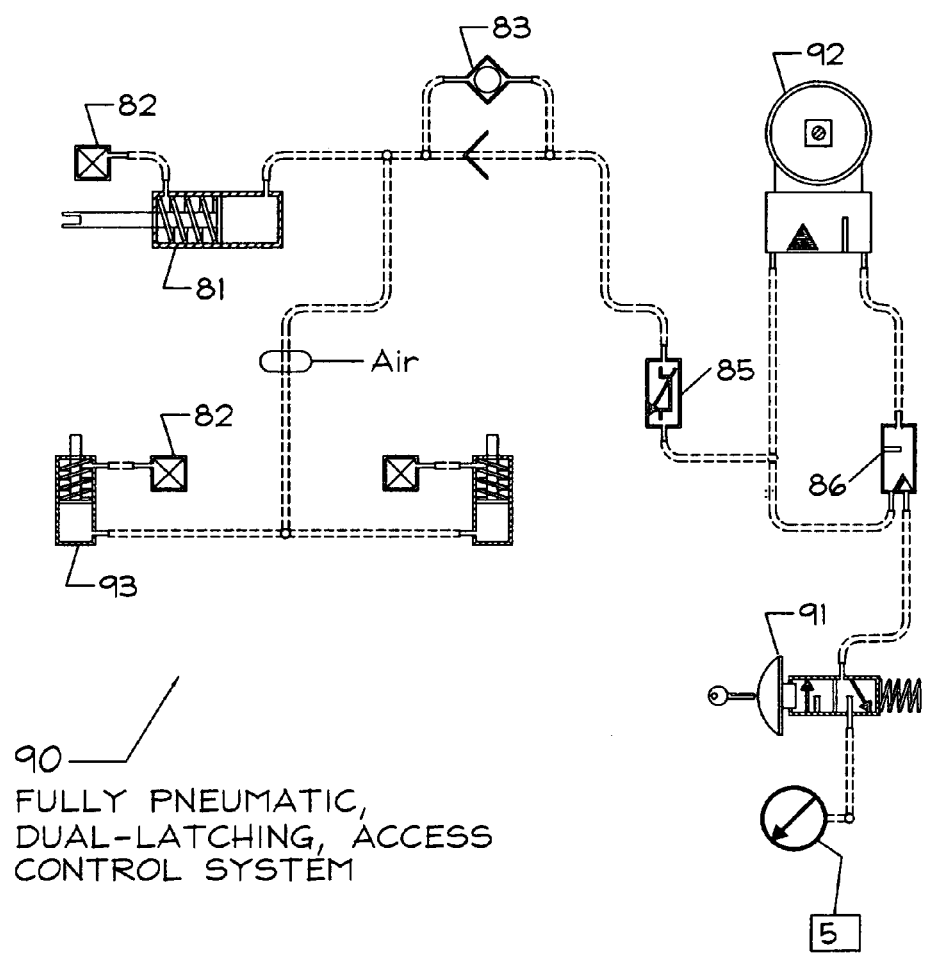
FIG. 14: DUAL, POSITIVE LATCHING PNEUMATIC SECURITY/ACCESS CONTROL SYSTEM SCHEMATIC

CODE COMPLIANT, TRASH AND/OR LINEN CHUTE INLET DOOR

CROSS REFERENCE TO RELATED APPLICATIONS

Please note that the title of this document has been simplified for ease of reference. This Non-Provisional Patent Application should be cross referenced with the previously submitted Provisional Patent Application: jc912 U.S. PTO 60/421,604 Dated Oct. 27, 2002, titled:

"AN AMERICANS' WITH DISABILITIES ACT (ADA) COMPLIANT TRASH AND LINEN CHUTE INTAKE DOOR FOR RETROFIT & NEW CONSTRUCTION ADDITIONALLY PROVIDING FOR SMOKE SUPPRESSION AND SUPERVISED ACCESS CONTROL"

STATEMENT OF FEDERALLY SPONSORED RESEARCH AND DEVELOPMENT

Not Applicable

REFERENCE TO SEQUENCE LISTING

Not Applicable

BACKGROUND OF THE INVENTION

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The present invention relates to an improved inlet system for trash chutes, linen chutes, (and any appropriate synonym for either "trash" or "linen" or "chute") and the like.

Trash and linen chutes are ubiquitous in new and existing residential and commercial buildings. They can also be found in hospitals, nursing homes, hotels and other facilities where relatively large amounts of trash and/or harmful waste are to be conveyed for disposal and/or treatment, whether by removal from the building, incineration, cleaning and/or recycling. Entry to a chute is made via one or more inlets, generally on each building floor. Such inlets are either bottom-hinged or side hinged, and open toward the user.

Building codes and other standards, including both U.L.® and the National Fire Protection Association (NFPA), typically require such trash and linen chutes, chute shafts and/or chute enclosures, (collectively, "chutes") and the inlets that serve them (whether collectively constructed of metal, concrete, fire-rated wall board, masonry, and the like, or some combination thereof) to be designed and constructed to afford the protection of the fire-ratings specific to the characteristics of the installation, i.e., zoning, occupancy use/type, building height and area, etc. The fire rated protection affords Life Safety relief to building visitors, users, occupants and/or firefighters from the untoward consequences of fires and/or their accompanying smoke discharges when such conflagrations are sourced in the chute or at the base of the chute. The intended reliefs come in many forms, either singularly or in combination including but not limited to, fire containment, fire suppression, fire alarms, and exiting or other egress paths. Please see appropriate codes and standards presented on the next page:

| Code | Standards | Description |
| --- | --- | --- |
| NFPA | 80 | This is the National Fire Protection Association Chapter 80 prescribes standards for gasketing materials used for air tightness to control noxious gases or smoke. The Stage I Gasket is in compliance with this standard. |
| | 105 | Definitions for Ambient, Warm and Hot Smoke Characteristics. Used as the basis for determining compliance with UL Air Tightness Standard, UL 1784. The Stage II Gasket is in compliance with this standard. |
| | 82 | National Fire Protection Association Chapter 82 (NFPA-82) governs the installation requirements for trash and linen chutes. The preferred embodiment meets the existing criteria of this document, including the standards pertinent to the ratios of effective opening and chute diameter for trash and linen chutes, which are addressed by the preferred embodiment in a completely new way. |
| | Fail-Safe Closed (Proposed New Standard) | This is a proposed new standard to NFPA-82. All previous art experiences and demonstrates a chute intake door failure by presenting the following symptom: the malfunctioning door fails to close. This failure automatically negates the intent of the UL B-Label design of the door because the door no longer closes nor positively latches as required by the UL 10-B, B-Label Standard (a protected opening is designed to prevent the spread of fire across the opening). The preferred embodiment is designed to correct this deficiency by failing to open in the event of a malfunction, thereby maintaining all the life safety features intended by the aforementioned UL standard. This is the essence of the Fail-Safe Closed feature. This feature exceeds the requirements of NFPA-82. |
| UL | 10-C | Allows for application of negative and positive pressure to a 90-Min. B-Label opening during fire conditions. Limits door deflection at the weakest point of the span and seals against smoke transfer across the protected B-Label opening. The Standard has never before been tested on a chute inlet door. All existing art meets the 90-minute B-Label Standard 10-B or other, similar, state-specified standards. Passing UL 10-C automatically includes passing the 10-B standard. Passing the UL 10-B standard does not qualify for 10-C approval. |

| Code | Standards | Description |
|---|---|---|
| | 250 Deg. Maximum Temp. Rise over 30 Minutes | Maximum allowable temperature rise over the first 30 minutes of the UL B-Label fire test measured at the center of the door face on the side opposite the flame. |
| | 1784 | Certification of Air Tightness. Never before applied to a chute intake door. Designed to control transfer of odors and gases across door opening during normal operation. The Stage II Gasket is in compliance with this standard. |
| | Retrofit Installation (Proposed New Standard) | Proposed new UL Standard for certified retrofit installation of replacement door (All existing replacements void UL certifications by destroying the originally designed assembly because the frame of the door must be removed from the wall (part of the UL 10-B, B-Label Assembly of wall + 90 minute intake door designed to work in concert with one another to prevent the transfer of fire across the protected opening). The preferred embodiment overcomes this deficiency in the existing art by leaving the original frame intact, thereby preserving and adding to the original assembly to maintain the B-Label protection. Additionally added is the UL 10-C Standard related to smoke control thru the use of intumescent materials designed and approved for 10-C applications. The Stage II Gasket is in compliance with this standard. |

Chute inlets typically provide containment through compliance with design features in accordance with Underwriters' Laboratories (U.L.®) Standard 10B. U.L.® 10B stipulates the fire test criteria for approval of 90-minute, B-Label doors to function as part of a door-plus-firewall assembly in new constructions to permit containment. The "assembly" concept is extremely important because a "B-Label" door does not provide containment as a freestanding object. In order to provide containment, the B-Label door must be assembled in a firewall in a manner identical to the assembly that was fire tested by U.L.® in order to secure the U.L.® B-Label rating for the door. In some rare instances, certain chute inlet manufacturers only design to State criteria, often very similar to U.L.®, but in those instances, their door products can only be used in those States issuing the approvals. The purpose of those approvals, however, is very similar in intent: To provide Life Safety protection and relief to building visitors, users, occupants, and/or firefighters.

The chute industry (and those who govern it with codes, guidelines, standards, inspections, etc.) recognizes that a problem exists when an inlet door of prior art fails. Specifically, component failure in prior art is identified by the inability of the inlet to properly close and latch. Such failure results in the total suspension of the B-Label design approval characteristics of the inlet-firewall assembly, thereby nullifying the potential for containment of fire and/or smoke emanating from the chute. Such failure consequently exposes building visitors, users, occupants, firefighters, and the physical property itself, to the real and well documented potential for catastrophic destruction and/or death.

It is further recognized that the replacement of a failed inlet door generally involves the removal of the existing door and its frame. That removed frame is part of the aforementioned U.L.® approved inlet-firewall assembly, originally constructed to specific Life Safety codes and standards. Removal of the existing inlet frame and the installation of a new inlet door and frame permanently destroys the U.L.® approval criteria because replacement requires destruction of the original anchoring criteria specified in compliance with the originally approved U.L.® testing. In short, the replacement of a door to repair a door that no longer closes (a retrofit installation) is only a choice of the lesser of two evils, not the restoration of original conditions.

Beginning in the previous decade, residential and other buildings have additionally become subject to the progressively revised provisions of the Americans' with Disabilities Act of 1990 (ADA). The mandatory compliance with this Federal law requiring Accessibility for existing buildings, such as apartment facilities and the like, requires the necessity of retrofit construction. The inherent problems of retrofit construction discussed in the previous paragraph are multiplied exponentially by this mandatory compliance.

| Code | Standards | Description |
|---|---|---|
| ADA | Grab-Pinch-Twist | ADA (The Americans' with Disabilities Act) prohibits grabbing, pinching, or twisting and operating mechanism in order to effectuate the device action. |
| | Operating Force | ADA limits the maximum operating force required to operate an interior door (without specificity to size) to five (5) pounds. |
| ADA | Grab-Pinch-Twist | ADA (The Americans' with Disabilities Act) prohibits grabbing, pinching, or twisting and operating mechanism in order to effectuate the device action. |
| | Operating Force | ADA limits the maximum operating force required to operate an interior door (without specificity to size) to five (5) pounds. |
| | Mounting Height | The maximum allowable mounting height of the operating mechanisms of an ADA compliant device is 54" (side reach) or 48" (front reach). |
| | Wall Projection | The maximum allowable projection of an ADA compliant device is 4" off the surface of the wall. |

Attempts by previous art to address accessibility issues fall short of fulfilling the original construction criteria as discussed in the preceding paragraphs [0007] and [0008]. This prior art also fails to insure that a damaged inlet will close in the event of component failure, if for no other reason than an open, bottom-hinged door that has experienced a gas cylinder, counterbalance-type-failure, cannot defy gravity in order to close itself.

Unauthorized or unsafe use of a chute inlet due to lack of access control can lead to serious injury or even death should a person injure themselves by falling. Small children and college students have been known to be among the unfortunate victims of such falls.

Prior art either ignores access control or makes it so expensive as to prohibit its use in many instances.

Prior art also falls short of protecting workers from the effects of potentially injurious repetitive movements prohibited for workers by the U.S. Occupational Safety and Health Act (OSHA).

| Code | Standard | Description |
| --- | --- | --- |
| OSHA | Repetitive Action | Repetitive manual activity can be injurious in the work place. The use of the magnetic key fob eliminates the need for using hands to operate the inlet door. Waste materials can be disposed of with a simple pushing action that can be accomplished without the use of hands if necessary. |

U.S. Pat. No. 6,062,368 issued to Cluster P. Kamm on May 16, 2000 discloses a pull-out door having a rather complex arrangement of an electric motor, electric piston and cylinder lenses for moving the door, a switch means and control. Both the door swingable about a vertical axis and the operating mechanism are set within a frame-like box which can be unitarily installed, i.e. fixed within a pre-prepared opening in the wall housing the chute or the opening of the chute itself.

The disadvantages inherent in the device of U.S. Pat. No. 6,062,368 are many:

(a) It is fixed in size and cannot be readily retrofitted or adjusted to variances caused differences in construction; It has a complex operating mechanism which cannot be easily repaired or replaced and which is costly to manufacture;

(b) Although the patent emphasizes sanitary and health benefits there is no provision to seal the frame-like box in the chute opening to prevent feed back of waste and gases;

(c) The device of the patent employs a swing axis for the door by which the door swings outwardly into the path of the user inhibiting the efficient use of the system by the user. It is difficult to open when the user has both hands full.

(d) In the event of a door component failure, the door fails in a "door open" position, thereby negating the minimum, outdated Life Safety features offered.

(e) Access supervision is not provided, and (f) The intake does not address OSHA requirements for the workplace.

In addition, various attempts have been made to provide non-automatic doors having a horizontal swing axis at the upper edge of the doors so that the door may close simply by falling. Refer to U.S. Pat. Nos. 1,108,1784; 1,297,360; 3,980,166; 4,339,998; and 4,694,947.

The patents, however, exhibit the same disadvantages as the aforementioned patent and above all, are not push-in.

BRIEF SUMMARY OF THE INVENTION

It is, therefore, an object of the present invention to provide a chute inlet door that overcomes the disadvantages and differences of the prior art.

It is another object of the present invention to provide a chute inlet door simple in construction and less costly than the prior art.

It is also an object of the present invention to provide an improved chute inlet door capable of being easily retrofitted to the chute and easily fitted thereto.

It is also an object to provide a chute inlet door having improved sanitary, health and Life Safety characteristics and which is fully sealed when closed, even in the event of door component failure.

It is also an object of the present invention to provide a chute inlet door having improved latch means.

It is an object of the present invention to provide a chute inlet door with inexpensive, supervised access control for all users, building occupants and workers, alike.

It is also an object of the present invention to improve Life Safety in buildings with chutes for visitors, users, occupants, and/or firefighters through compliance with the applicable provisions of the various laws, codes, standards, and guidelines afforded by U.L.®, and NFPA for both new and retrofit construction. In this regard the following synopsis of applicable provisions mentioned above is provided:

It is also an object of the present invention to improve Accessibility in buildings with chutes, whether of new or retrofit construction, through compliance with the applicable provisions of ADA. In this regard the following synopsis of applicable provisions mentioned above is provided:

It is yet another object of the present invention to improve work place safety in accordance with applicable OSHA standards.

These objects and advantages as well as others will be seen from the following application.

BRIEF DESCRIPTION OF THE SEVERAL VIEWS OF THE DRAWINGS

In the Drawings:

FIG. 1 (1/14) is an exploded view of the inlet door sections and their physical interrelationships to the frame of the current invention. The view is from the rear.

FIG. 2 (2/14) is a table of the interrelationships of the inlet door sections, and the various components of those sections, in relationship to the code compliance design criteria (ADA, U.L.®, NFPA, and OSHA) to which inlet doors are subject and formed the basis of this invention.

FIG. 3 (3/14) is a front elevation of the trash/linen chute inlet door of the present invention.

FIG. 4 (4/14) is an elevation of the inlet door frame indicating the various components of the door, access control, assisted lift & dampening, and dual latching systems all housed by the frame.

FIG. 5 (5/14) is an exploded view of the frame components that create the unique frame throat projection, component housings and inlet-surrounding construction-mating surfaces for the installation of Stage II gasketing for new and retrofit installations. Also called out are vertical Cross Sections A-9/14 and A-10/14.

FIG. 6 (6/14) is a view from the rear of the door stop assembly components that create the Stage I gasket mounting surfaces through cooperation between the stop assembly and the top of the frame.

FIG. 7 (7/14) is a view of the interior structural components of the door frame and the assisted lift and dampening components that control the movement of the door.

FIG. 8 (8/14) is a view of the two-piece face panel components that create the exterior skin of the door and provide mounting surface for one application of the Stage II gaskets.

FIG. 9 (9/14) is the Section A-9/14 called out in FIG. 5. This is the surface mounted, retrofit construction installation of the door indicating the Stage II gasketing between the rear of the frame and the mounting wall and the Stage I gasketing between the door stops and the front face of the inlet door. Also indicated is the rearward movement of the door swing.

FIG. 10 (10/14) is the Section A-10/14 called out in FIG. 5. This is the flush mounted, new construction installation of the door indicating the Stage II gasketing between the rear of the frame and the mounting wall and the Stage I gasketing between the door stops and the front face of the inlet door. Also indicated is the rearward movement of the door swing.

FIG. 11 (11/14) includes details of a mechanical, dual-positive latching mechanism powered manually by pushing against the large paddle that can alternatively be mounted on the surface of the door. A key lock provides access control. This drawing also details the construction details of the Stage I gasket system. The gasket is shown in its compressed position of repose between the door stop and the front face of the inlet door.

FIG. 12 (12/14) is a schematic of the preferred dual, positive latching, electronic security/access control system. A complete version of the latching mechanism can be seen in FIG. 4 that depicts the latching mechanisms (72) attached to the solenoids (73).

FIG. 13 (13/14) is a schematic of an alternative, a dual, positive latching, electro-pneumatic security/access control system. A complete version of the latching mechanism can be seen in FIG. 4 that depicts the latching mechanisms (72) attached to the solenoids (73).

FIG. 14 is a schematic of an alternative, a dual positive latching, fully pneumatic security/access control system A complete version of the latching mechanism can be seen in FIG. 4 that depicts the latching mechanisms (72) attached to the solenoids (73). Alternatively, the latch actuators can be mounted horizontally to project/retract directly into and out of the inlet door panel.

DESCRIPTION OF THE PREFERRED EMBODIMENT

This latest inlet is designed for compliance with the applicable provisions and requirements of ADA, U.L.®, and NFPA to achieve an inlet that is capable of retrofit installation. This current art is further designed for compliance with a new U.L.® Standard for B-Label Doors, UL 10C, which considers the effect of negative and positive pressures on doors and smoke control in a fire event. The current art is also designed to meet the criteria of UL 1784 for air tightness as an adjunct to the UL 10C criteria that also includes the control of ambient, warm and hot smoke as defined by NFPA-105, and is beyond the scope of the UL 10B approval for B-Label rated fire doors. UL 10C approval automatically achieves approval of UL 10B. UL 10B does not reach the UL 10C Standard, however.

With further regard to ADA, the current art meets the criteria for horizontal projection, mounting height of controls, the prohibition against grabbing, pinching or twisting of operational controls, and the criteria for opening and closing force of interior doors.

With regard to OSHA, the inlet complies with criteria designed to avoid repetitive actions in the workplace.

A particular use of the present invention is as the inlet door assembly for a trash chute 2 to feed a commercial/residential trash compactor or other trash room waste collection configuration. The inventive inlet may also be used in a variety of other installations as well, including commercial and institutional uses for linen collection. The embodiment shown in the drawings is illustrative and will amply exemplify the structure and details of the invention.

As seen in FIG. 7 and FIG. 8, the several door panel components 31, 32, 33, 34, 41, 42 comprises a fireproof door panel 30/40 preferably having a front face 41 and rear face 42 between which is interposed a fire retardant insulation material 34 and a tray/frame 30 for the insulating material 34 that also acts to provide significant stiffness to the door 30/40 for purposes of enhanced structural integrity for durability against abuse and for added stiffness related to the desired level of fire rating under test conditions that might be imposed by Underwriters Laboratories (U.L.®) or the like. The inlet is set within a complimentary rectangular frame 10 also made of fire resistive materials like sheetmetal or a casting installed within a tight fitting opening in the wall 1 or within the framed opening 2 of a chute 3. The wall 1 or chute 2 may be a new installation or an existing one. As will be seen, the invented inlet assembly may be used to refurnish existing buildings. The frame 10 extends outwardly from the wall 1 or chute 2 to define an aesthetic trim 100 for the door 30/40 and between which suitable Stage I gasketing 111 or Stage II gasketing 112 is placed so as to seal the door 30/40 during both normal operating conditions and during conditions of fire emergency. The frame 10 is bolted or otherwise secured to the wall by suitable fasteners 19 about its perimeter, and a bead of Stage II gasketing 112 or the like is inserted between the wall 1 and the existing chute frame 2.

The door panel 30/40 is hinged with a 1" diameter pipe 31 along its topmost edge to frame sides 15, 16 and set in oil-lite bushings 18. In preference, the door panel 30/40 may be provided with several operating mechanisms depicted in FIGS. 11, 12, 13, and 14 that will be described separately, each of which has the following net effect: providing opening access operation that requires no grabbing, pinching or twisting as required for compliance with the provisions of the Americans with Disabilities Act of 1990, and/or its subsequent amendments, updates, modifications, etc.; providing dual, positive latching 72 for Life Safety and security issues; providing assisted lift 54 (either full or partial) to the upward travel (opening) of the door panel 30/40; providing dampened return 53 to the downward travel (closing) of the door panel 30/40; and to automatically bias the door panel 30/40 into its closed position where it bears against the pari-mutuel Stage I gasket 111 and centers on the latch bolts 72 to maintain the Life Safety design criteria features in normal use and especially as the default, fail-safe position in the event of an inlet component failure.

The supervised, security/access control operating systems depicted in FIGS. 11, 12, 13, and 14 include one of several options as may be dictated by the requirements of the new or retrofitted construction, and are as follow:

(a) A mechanical system of dual latches 72, identified in FIG. 11, actuated manually by pressure against a panic bar-type device 61, and protected from undesirable access by lock and key 62, 63;

(b) An electronic system of dual latches 72, identified in FIG. 12, actuated by a secure access control switch 75 and magnetic fob 76 of any of several possible configurations and devices, including but not limited to, magnetic switches 75, 76, card swipes, keypads, biological identifiers, or the like, etc., of any voltage and from any appropriate DC power system/source 77 or AC power source. Also utilized is an electronic timer 74 that activated by magnetic switches 75, 76 to send a signal to the DC power system/source 77 and to the solenoids 73 that retract for a settable timing sequence of up to ten seconds duration that release the dual latches 72 allowing use of the door panel 30/40 for as long as the user prefers. After the timing sequence ends, dual latches 72 are released by the solenoids 73 permitting the now extended dual latches 72 to await the return of the door panel 30/40 to its natural angle of repose against the stop assembly 20. This alternate is considered best mode because of its simplicity of assembly and maintenance.

(c) An electro-pneumatic system of dual latches, identified in FIG. 13, actuated by a secure access control switch 75 and magnetic fob 76 of any of several possible configurations and devices, including but not limited to, magnetic switches 75, 76, card swipes, keypads, biological identifiers, or the like, etc., of any voltage and from any appropriate DC power system/source 77 or AC power source, and utilizing a pneumatic cylinder/plunger 81 in conjunction with a flow control 83 and a regulator needle valve 82, all of which are controlled by and electro-pneumatic timer 84 supplied with house compressed air supply 5 and a 24 volt DC power source 4 to provide action in accordance with that described in the previous paragraph with regard to the movement of the door panel 30/40;

(d) A fully pneumatic system of dual latches, identified in FIG. 14, actuated by keyed-palm button/switch 91, timed by a pneumatic timer/sequencer 92 powered by a house compressed air supply 5. Activation of the door panel 30/40 is by pneumatic cylinder/plunger 81 in conjunction with a flow control 83 and a regulator needle valve 82, and occurs when the pancake latch/valves used in conjunction with regulator needle valve 82 and acting directly as the dual latch mechanism releases the door panel 30/40 for normal operation. This option may also be actuated by pneumatic switching source/device connected location, at any acceptable pressure required to power the system.

The novel construction of the frame 10, trim 100 and the door panel 30/40 is shown in detail in FIGS. 7, 8, 9, and 10. The inlet frame 10 is an assembly of sheet metal parts, preferably of aluminized steel, since such material can be bent, cut and shaped at relative ease. Sheetmetal is also light, and provides fire resistance. In he alternative, castings can be used. Simply, the frame consists of two side members 15, 16 reinforced by a vertical bracket/trim 17 bearing point at its forward end. The bodies of the side members 15, 16 are stepped down from the forward end to provide two levels to the frame, one to facilitate surface mounting of the embodiment, and the other to provide access to the throat of a chute 2 being retrofitted with this embodiment. The side members 15, 16 are spaced apart to form at the front an opening for the door panel 30/40 and at the rear a stop assembly 20 preventing the excess movement of the door panel 30/40 (15"×18" is the most common trash door size, while other sizes up to 24"×24" are fully possible with the current art. The opening at the front of the frame 10 in cooperation with trim 100 is designed to approximate the allowable effective opening of the door panel 30/40, by code guideline/convention a proportional fraction of the diameter of the chute 2 being serviced by the inlet. The frame is covered at the top by a C-shaped form 11 fitting over the forward longer bezel. The rear-most leg of the C-shaped form is shortened laterally at each end, leaving a small overhang at one end and a larger overhang at its other end. A second, inverted C-shaped form 12 closes the side members 13, 14 at the bottom end 12. The second channel member 12, however, is different in that the foremost is shorter than its rear wall. The side members are further braced by a simple bracket fixed 17 to each side of the members 15, 16 and extended across the rear opening. Lastly the several parts are simply assembled by placing the parts together to form the frame assembly 10 shown in FIG. 1 and the extending horizontal projection in to the chute 2 perpendicular to the wall 1 is folded over the adjacent corner and the main edges welded together. The perimeter adjoining edges of the welded frame 15, 16 and the required frame penetrations for control and other system needs are protected by intumescent caulk 113, or the like to prevent the escape of fire or smoke in the event of a fire as an additional Life Safety feature of the embodiment.

As seen in FIGS. 8 & 9 the bottom of the inlet frame 10, when assembled, provides a stop assembly 20 limiting the outward or return movement of the door panel 30/40 as it swings shut. The door panel 30/40 comes nearly flush with the edges of the frame opening and forms a seal against escape of he pollutants or fire or smoke, since this perimeter is provided with a Stage I gasket 111. An additional, Stage II 112 gasket, mounted to the door panel 30/40 edges is provided to provide a permanent seal against gas/smoke escape in the event of a fire as an additional Life Safety feature of the embodiment.

The trim 100 can be of any of several colors or exposed metal decorative finishes, and can be embossed with any of several messages or logos.

The description of this preferred embodiment will likely give rise to suggested alternatives and modifications among those familiar with the industry and such products. It is therefore, the desire of this submission to include all such suggested alternatives and modifications as if they were herein incorporated in the scope of this preferred embodiment.

The invention claimed is:

1. An inlet door to provide access to a chute constructed as or behind a fire-rated wall whether the wall is existing or new, the inlet door includes several components comprising:

an exterior trim piece receiving a frame;

the frame including an opening in the middle, the frame having a portion extending forwardly less than four inches from the opening, the frame portion receiving fire stopping gasketing, the frame including four flat surfaces interconnected to present a single vertical plane adapted to be parallel to a wall in which the frame is to be mounted, the flat surfaces set around the middle opening and receiving fire stopping gasketing, the frame including a four sided generally rectangular projection set around the middle opening and extending rearwardly from the four flat surfaces to be mounted within an existing wall opening or chute throat, and fire stopping caulking positioned on the frame;

a stop assembly mounted within the frame and including a mounting surface inclined away from a user and having gasketing positioned thereon;

a door panel including an inner door frame and an outer two-piece skin of a decorative nature, the inner door frame comprised of at least two side panels and a bottom panel of heavy gauge metal welded together to form a unitized tray which receives insulative material and resists deflection, a steel pipe or rod positioned at the top of the tray providing horizontal pivoting and closure to the top of the door panel, the outer two-piece skin comprising a front skin panel receiving gasketing and including holes as receptors for latches, and a rear skin panel engaging the front skin panel to enclose and protect the inner door frame and the insulative material therebetween;

mechanical, electronic, electro-pneumatic, or fully pneumatic, single or multiple positive latching activation means mounted within the frame and designed to engage the door panel and the stop assembly to provide reliable, fail-safe latching to insure engagement of the door panel and the gasketing;

supervised access control of the single or multiple positive latching activation means which is mounted in the frame portion and activates a timer that activates the latching means and withholds the latching means allowing sufficient user disposal time and preventing premature closing of the door panel;

assisted lifting for the door panel by a first gas-over hydraulic piston mounted nearly vertically on either side of the frame to provide for assisted lifting of the door panel whereby the door panel can be pushed open by pushing disposal materials away from the user and into the door panel, the door panel closing by gravity and compressing the stop assembly gasketing;

dampened closing for the door panel by a second gas-over hydraulic piston which is adapted to protect the user from debris dropped from above and to control the rate of close of the door panel, the dampened closing means allowing for a pressure increase in the last approximately two inches of closing travel of the door panel to insure compression of the stop assembly gasketing and to facilitate the single or multiple positive latching of the door panel for a fail-safe door-closed position; and the trim piece designed for retrofit or new construction installation of the inlet door, the trim piece providing either surface mounted or flush mounted protection to facilitate complete covering and serviceability of the exterior perimeter of the frame and the access control and latching means, the trim piece including a lip to cover a portion of the stop assembly gasketing to protect it from wear, and the trim piece establishing an effective opening.

2. The inlet door according to claim 1, wherein the mechanical latching means comprises a manually operated panic-bar device mounted to a front of the door panel, the access control including a key lock, and the mechanical latching means projecting into side faces of the stop assembly.

3. The inlet door according to claim 1, wherein the electronic latching means comprises the access control as a magnet/reed switch or other electronic access control powered internally or externally and utilizes the electronic latching means by a timed solenoid.

4. The inlet door according to claim 1, wherein the electro-pneumatic latching means comprises the access control as a magnet/reed switch or other electronic access control powered internally or externally, the electro-pneumatic latching means powered by compressed air including cylinders/plungers, a flow controller, a regulator needle valve, and an electro/pneumatic timer.

5. The inlet door according to claim 1, wherein the fully pneumatic latching means comprises keyed, palm-button switching, pneumatic timing, and sequencing either through the use of separate parts or combined within a pneumatic logic circuit, the fully pneumatic latching means powered by compressed air including cylinders/plungers, a flow controller, a regulator needle valve, and an electro/pneumatic timer.

6. The inlet door according to claim 1, wherein the unitized tray further comprises a front panel.

* * * * *